April 12, 1932.     A. DE SCHEBEKO     1,854,116
TOOL
Filed March 13, 1930
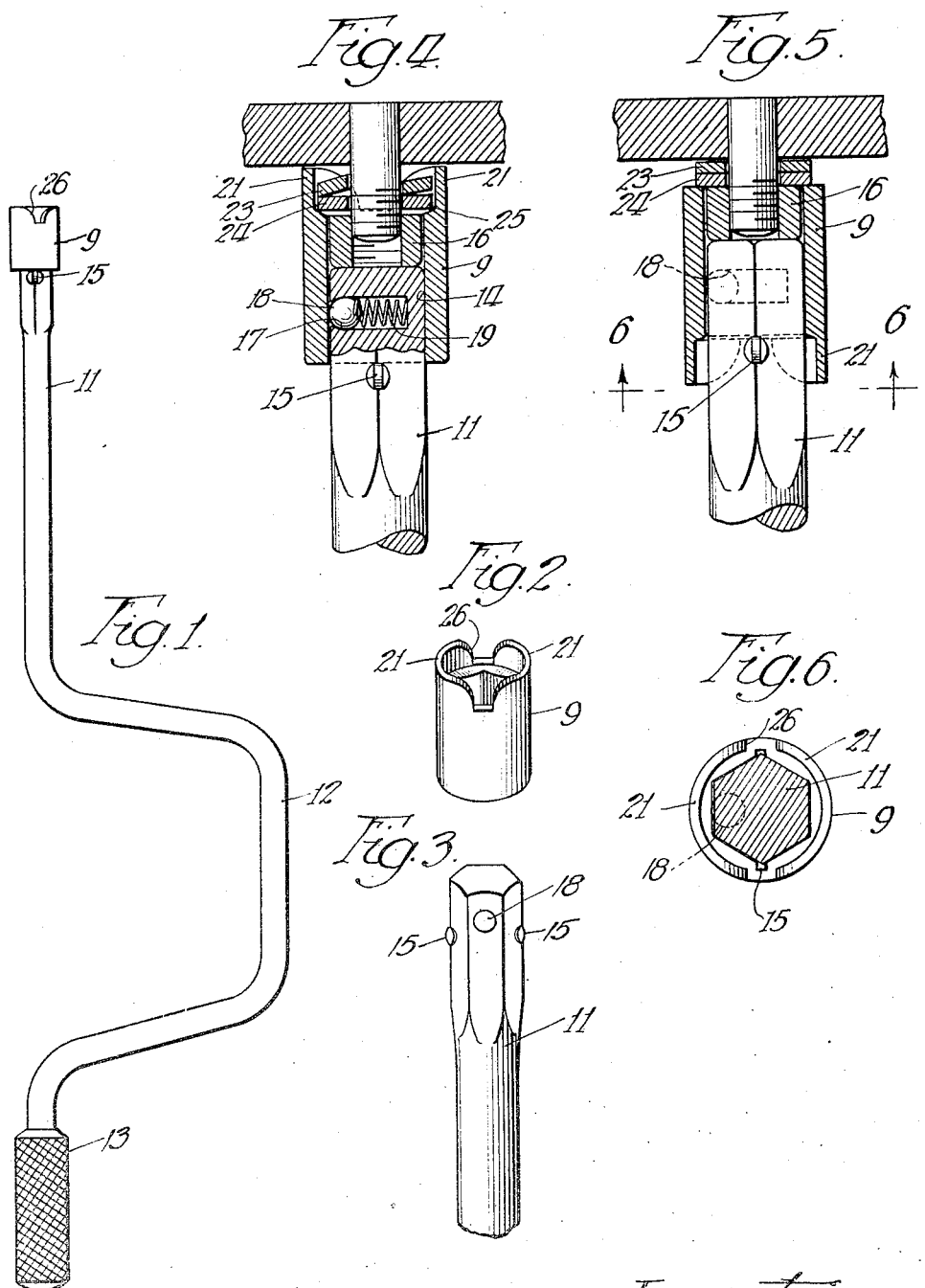

Patented Apr. 12, 1932

1,854,116

UNITED STATES PATENT OFFICE

ALEX DE SCHÉBÉKO, OF CHICAGO, ILLINOIS

TOOL

Application filed March 13, 1930. Serial No. 435,408.

My invention relates to a tool and more in particular to a tool for attaching and screwing a nut and washers to bolts in rather inaccessible places.

There are many instances where bolts are located in narrow spaces, making it difficult to reach the bolt with both hands, so that it is necessary to place the washers over the bolt and start the nut on the bolt with one hand. This is particularly true in attaching the crank case of an engine to the engine block. The narrow space between the crank case and the frame of the car renders it extremely difficult to place the washers over the end of the bolts which hold the crank case, and at the same time thread the nut on to the bolt. A difficulty in the solution of the problem of providing means for holding the washers and nut in alignment while securing them upon the bolt lies in the fact that such means tends to be in the way when tightening the nut upon the bolt. In accordance with the general features of the invention I provide an invertible head having a flange at one end for retaining the washers and nut in alignment while starting the nut on the bolt, and when the nut is started the head is inverted to tighten the nut.

An object of the invention is to provide a new and improved tool for securing a nut and washers on a bolt.

A further object is to provide a simple tool of this type which is handy and convenient to use.

A further object is to provide a tool having the double function of starting and tightening a nut and washers upon a bolt.

A further object is to provide a tool for supporting a nut and washers in proper alignment so as to be readily attachable in a confined space.

Other objects and advantages will appear as the description proceeds.

Referring to the drawings:

Fig. 1 is a side elevation of a device embodying my invention,

Fig. 2 is a perspective view of a removable head,

Fig. 3 is a perspective view of a portion of the shank,

Fig. 4 is a sectional view of a portion of the tool showing it in position for starting a nut on a bolt, Fig. 5 is a similar sectional view showing the head inverted for tightening a nut and washers on a bolt, and, Fig. 6 is a sectional view taken on line 6—6 of Fig. 5.

The tool consists generally of a removable head 9 mounted upon a shank 11. The shank is integral with a brace 12 for rotating the shank, and the lower end of the brace is provided with a revoluble handle 13. The outside of head 9 is preferably made cylindrical and the inside is provided with a hexagonal opening extending therethrough. The upper end of shank 11 is also made hexagonal so as to fit into the opening of the head, and in order to limit the distance that the shank may be inserted into the head a pair of ears 15 is formed on the shank the required distance from the end of the shank. These ears are disposed in such a position that when the shank is inserted in the hexagonal opening in the head, a hexagonal space for receiving a nut 16 will remain. In order to prevent the head from falling off the shank, the shank is provided with a drill hole 17, having a spring pressed ball 18 therein, which is urged against the inside of the head by means of a spring 19. One end of the head is provided with a flange 21 forming an extension of the outside of the cylinder. Interiorly of the flange a circular opening is formed somewhat larger in diameter than the hexagonal opening in the head, and serves to form a receiving space for a lock washer 23 and an ordinary washer 24. Intermediate the opening, formed between the flange and the hexagonal opening in the head, is a bevelled shoulder 25, which causes the nut 16 to readily slide into the head when dropped between the flanges. At diametrically opposite points the flange 21 is provided with slots 26 which assist the user in dropping the nut into its space in the head. It will be noted that these slots coincide with opposite angles of the hexagonal opening, which makes it convenient to grasp a nut at corresponding points and guide it into the head, but retaining hold of the nut until it is lowered and enters the head. In using the tool, the head is first placed on the shank with flange 21 extending upwardly. A nut is then inserted in the head, which is followed by placing a plain washer in the space provided between the flange, and then placing a lock washer over the plain washer. In this position the apertures of the washer and nut are in alignment and in their proper position for being started on the bolt. Due to the fact that the bolts, as for instance, crank case bolts, are in relatively inaccessible places, shank 11 is made long enough so that when the head is in position to place a nut upon a bolt, brace 12 is in an unobstructed place to permit rotation of the shank. After the nut is started upon a bolt, the continued rotation of the head would cause the nut to be withdrawn from the head and thus make it impossible to tighten the nut on the bolt. Therefore, as soon as the nut is started, the tool is withdrawn from the nut and the head is inverted on the shank as shown in Fig. 5. The nut may then be tightened in the usual manner and the flange is out of the way and lying over the shank in this position.

Applicant has found by experience that in attaching a crank case to an engine block, more time is consumed in starting the nuts upon the bolts than by the operation of tightening the nuts. By use of this tool for starting the nuts upon the bolts, and then tightening them with the same tool, the time required for attaching a crank case is reduced to a minimum. It is not necessary to invert the position of the head for each nut; a series of nuts may be started with the head in one position, after which the head is inverted and all of the started nuts are tightened.

It will be understood that the embodiment of the invention herein described and illustrated is merely illustrative of the invention, and that many modifications may be made therein without departing from the spirit and scope of the invention.

What I claim is new and desire to protect by Letters Patent of the United States is:—

1. In a tool of the class described, a head having means at either end for receiving a nut of a given size, one end of said head having means for positioning a washer in alignment with said nut and a shank attachable to either end of said head whereby the nut may be tightened after being attached to a bolt.

2. In a tool of the class described, a head having a polygonal opening therethrough for receiving the same size nut in either end, a shank insertable in either end of said opening for actuating the head, and a flange at one end of said head forming an extension of the outer wall of said head for supporting a washer in alignment with said opening.

3. In a tool of the class described, a head having a polygonal opening therethrough for receiving the same size nut in either end, a shank insertable in either end of said opening, means for limiting the amount said shank is insertable to leave a space for a nut in said opening, and an extension on the head forming a circular cavity above said polygonal opening for supporting washers on the nut in one position of the head, said extension lying over the shank so as not to interfere with the tightening of the nut in the other position of the head upon the shank.

4. In a tool of the class described, a head having a polygonal opening therethrough for receiving the same size nut in either end, a flange on one end of said head having a larger opening forming a washer receiving space, a bevelled shoulder between said space and said opening to allow a nut to slide into said opening, a shank insertable a predetermined distance into said opening leaving a nut receiving space at the opposite end of the head, said shank being selectively insertable in one end of the head a given distance for attaching and in the other end a greater distance for tightening a nut with washers therefor.

5. In a tool of the class described, a head having a polygonal opening therethrough, either end of said head being adapted to selectively receive a nut or a shank, a flange on one end of said head forming a washer receiving space, said flange having a pair of oppositely disposed slots for facilitating the insertion of a nut and washers in the head, and a shank selectively insertable in either end of the head for attaching and tightening the nut and washers.

In witness whereof, I hereunto subscribe my name this 26th day of February, 1930.

ALEX DE SCHÉBÉKO.